United States Patent
Yang et al.

[11] 3,798,896
[45] Mar. 26, 1974

[54] OPTICALLY ACTUATED TWO POSITION MECHANICAL MOVER

[75] Inventors: Lien C. Yang, Los Angeles; Arthur J. Murphy, Sierra Madre, both of Calif.

[73] Assignee: The United States of America as represented by the National Aeronautics and Space Administration, Washington, D.C.

[22] Filed: Aug. 24, 1972

[21] Appl. No.: 283,502

[52] U.S. Cl. .................................................. 60/25
[51] Int. Cl. ............................................. F03g 7/06
[58] Field of Search ........................ 60/1, 23, 24, 25

[56] References Cited
UNITED STATES PATENTS
2,976,675  3/1961  Bonner .................................... 60/25
3,495,406  2/1970  Donatelli et al. ...................... 60/1 X

*Primary Examiner*—Edgar W. Geoghegan
*Assistant Examiner*—Allen M. Ostrager
*Attorney, Agent, or Firm*—Monte F. Mott; John R. Manning; Wildred Grifka

[57] ABSTRACT

An optically actuated mechanical mover adapted to be moved from an ambient position to an active position, is disclosed. The mechanical mover essentially comprises a piston/cylinder arrangement including a piston that is contained within an internal cylindrical chamber of a housing. The cylindrical chamber is configured to permit the piston to be moved for the length of the chamber as a work stroke. A lock pin extending through the piston, and diametrically opposed walls of the chamber housing, retain the piston in the ambient position at one end of the chamber. An actuator for producing a pressure or shock wave that drives the piston is positioned at the end of the chamber corresponding to the piston ambient position. The actuator includes a transparent window panel having a metallic film coated on an interior surface thereof to be vaporized in response to an incident pulse of laser energy and thereby produce the desired shock wave. A stem extending from a face of the piston and through a corresponding end wall of the chamber, transmits the work force developed by the work stroke of the piston. A plurality of mechanical movers may be concurrently, or successively, actuated by using an optical control system including a beam splitter, rotating prism, or the like, or by using a fiber optic bundle to conduct the laser energy from a single laser to each of several mechanical movers.

18 Claims, 3 Drawing Figures 3,798,896
FIG. 1.
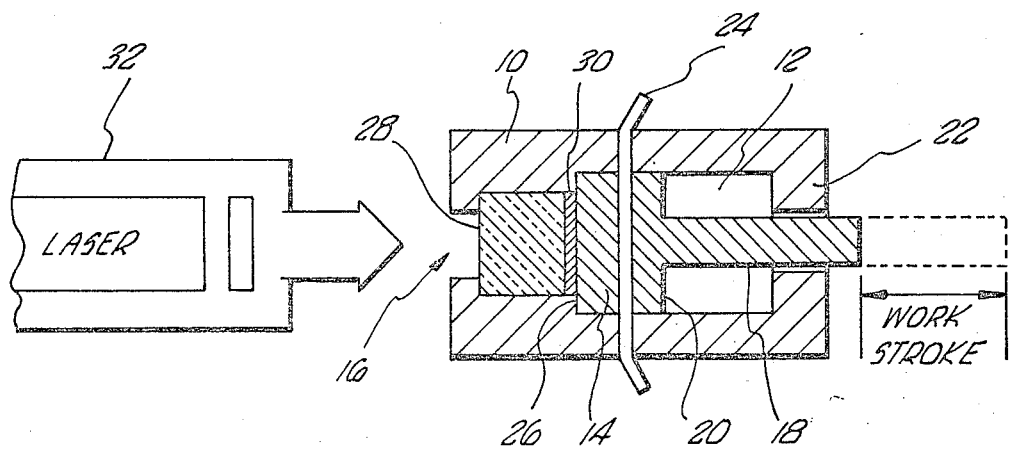
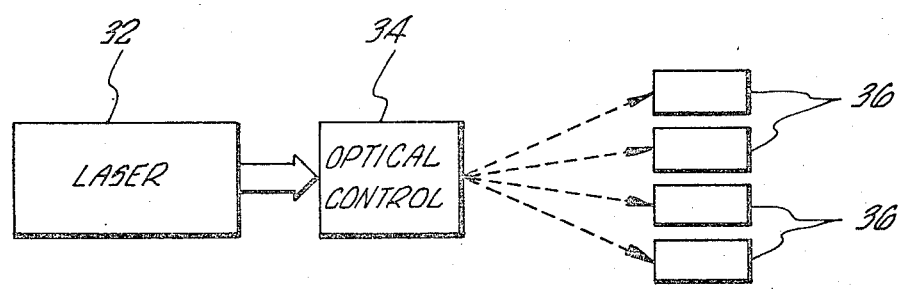
FIG. 2.
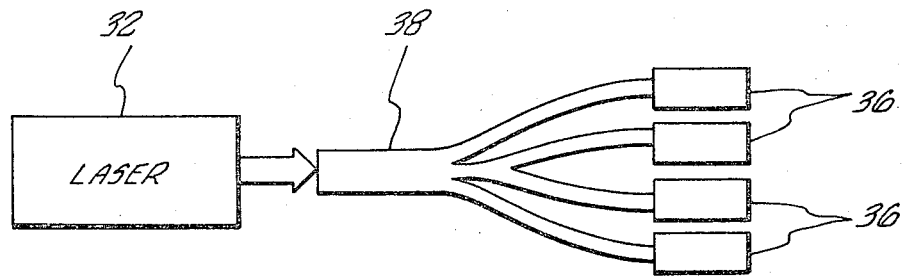
FIG. 3.

OPTICALLY ACTUATED TWO POSITION MECHANICAL MOVER

BACKGROUND OF THE INVENTION

1. Origin of the Invention

The invention described herein was made in the performance of work under a NASA contract and is subject to the provisions of Section 305 of the National Aeronautics and Space Act of 1958, Public Law 85-568 (72 Stat. 435; 43 U.S.C. 2457).

2. Field of the Invention

This invention generally relates to mechanical devices having two positions corresponding to ambient and active positions or latched and un-latched positions, etc. More particularly, the present invention concerns a mechanical mover that is optically actuated to have a working member driven from an ambient position to an active position in response to a pulse of laser energy.

3. Description of the Prior Art

Remotely actuated mechanical devices are available in various forms in the prior art. Many of these devices are either radio controlled or electrically operated. The familiar toy airplanes, garage door, television tuning dial, etc., are exemplary of the radio controlled devices while the common light switch in most buildings is exemplary of electrically controlled devices.

The radio controlled devices are comparatively complex since a receiver of some sort is required. The simplest of radio-controlled devices may be tuned for an activating signal of a single frequency at the expense of having the device susceptible to undesired or inadvertant actuation.

Electrically controlled devices require a length of a suitable electrical conductor to connect the device to a power source and control mechanism. The required electrical cables have been found to be cumbersome for certain applications where long distances between the controlled device and the power source and control mechanism are involved or where conservation of space and weight are important such as in spacecraft, satellites, etc.

In the case of spacecraft, the remotely controlled devices may be miniature latches, or the like. Customarily, such latches may involve the use of a pyrotechnic that is exploded to open the latch and thereby free a portion of the spacecraft such as a shroud, etc. An electrical wire is typically used to conduct electrical energy to the pyrotechnic to produce explosion.

The explosive end products attendant to the use of pyrotechnics may include a mixture of solids and gases. These end products may contaminate adjacent equipment unless the pyrotechnic is enclosed by a gas-tight holding chamber. The need for such a chamber, and its use, is complex and costly. Further, the explosion of pyrotechnic charges creates a rather strong physical shock which can effect the operation of nearby equipment. Finally, the use of pyrotechnics require that appropriate precautionary measures be taken to avoid inadvertant explosion.

It is accordingly the intention of the present invention to provide a mechanical mover that is optically actuated to eliminate the need for connecting wires, the potential for inadvertant or untimely activation, the possibility of contamination by explosive end products, and the disruptive effects of any mechanical shock attendant to the detonation of pyrotechnics.

OBJECTS AND SUMMARY OF THE INVENTION

It is a primary object of the present invention to provide an optically actuated mechanical mover that may be used as a switch, a latch, or the like.

It is another object of the present invention to provide a two-position mechanical mover that may be used to provide mechanical work in response to the application of a pulse of laser energy.

It is a further object of the present invention to provide a mechanical mover that may be remotely actuated without the need for connecting electrical wires or the like.

It is a yet further object of the present invention to provide a two-position mechanical mover that may be used in multiples which are concurrently or successively actuated by a single source of laser energy.

Briefly described, the present invention involves a two-position mechanical mover that may be remotely actuated by application of a pulse of laser energy.

More particularly, the subject invention includes a piston and a housing forming a cylindrical chamber in which the piston is moved. An actuator positioned adjacent the piston at an end of the cylindrical chamber produces a moving force that drives the piston to the opposite end of the chamber. A piston stem extending out of the chamber may be used to transmit the work stroke of the piston outside the chamber in response to the application of laser energy. A lock pin may be used to retain the piston at its ambient position in the chamber. Multiple mechanical movers may be concurrently or successively actuated by directing a portion of the laser energy to each of several mechanical movers.

Further objects and the many attendant advantages of the invention may be best understood by reference to the following detailed description taken in conjunction with the accompanying drawings in which like reference symbols designate like parts throughout the figures thereof.

BRIEF DESCRIPTION OF THE DRAWINGS

FIG. 1 is a schematic diagram illustrating an optically actuated mechanical mover in accordance with the present invention.

FIG. 2 is a schematic diagram illustrating how multiple mechanical movers may be concurrently or successively actuated by optically split laser energy from a single source in accordance with the present invention.

FIG. 3 is a schematic diagram illustrating the use of a fiber optic bundle to direct laser energy to each of several mechanical movers.

DESCRIPTION OF THE PREFERRED EMBODIMENT

Referring to FIG. 1 of the drawings, a mechanical mover in accordance with the present invention comprises a housing 10 having an internal cylindrical chamber 12 in which is positioned a piston 14 of matching configuration. An initiator or actuator 16 is positioned at one end of the housing 10 to communicate with both the internal cylindrical chamber 12 and the exterior of the housing 10.

The piston 14 may be provided with a piston stem 18 which extends from one face 20 of the piston 14. The piston stem 18 extends through an end wall 22 of the housing 10 to communicate with the exterior of the housing 10.

A lock pin 24 may be used to maintain the piston 14 in an ambient position within the chamber 12 adjacent the initiator 16. As shown, the lock pin 24 may be extended through the piston 14 and the diametrically opposed walls of the chamber 12. The lock pin 24, as well as the piston 14, may be made of a suitable metal to permit the lock pin 24 to be sheared when a predetermined amount of force is applied to a face 26 of the piston 14.

The initiator 16 may be formed by a transparent window panel 28 having a thin metallic film 30 that is coated or deposited on a surface of the window panel 28 forming an interior wall at one end of the chamber 12. Glass, quartz, or the like, may be used to form the transparent window panel 28. Quartz is considered to be particularly suitable for high temperature applications.

The metallic film 30 may be made of any suitable metal which is opaque and which can be vaporized by the direct application thereto of a pulsed laser energy. The characteristic of being opaque is intended to include a material being light absorptive at the frequency of the laser light used. For example, it has been found that an aluminum film deposited on the surface of a glass window panel 28 to a thickness of 1,000 Angstroms is readily vaporized when a Q-switched laser pulse of less than one joule is applied thereto. A Q-switched laser is intended as a laser system that generates a single laser pulse having a time duration of less than one-tenth of a microsecond.

Vaporization of the metallic film 30 creates a rapidly expanding plasma that is directed away from the window panel 28 and at the face 26 of the piston 14. Also found to be suitable for use in place of the metallic film 30 are carbon and bismuth. It is noted that other non-metallic thin films besides carbon may be useable for the intended purpose hereof.

Although the optimum metal, and thickness therefor, has not been as yet determined, it has been found that the metallic film 30 should be sufficiently thick to permit total absorption of the laser energy by the metallic film to complete vaporization thereof. Also, it has been found that there is no apparent advantage in increasing the thickness of the metallic film 30 beyond a dimension at which the additional mass results in a lesser temperature and pressure in the plasma produced by vaporization during the laser absorption period.

The rapidly expanding plasma resulting from the vaporization of the film 30 by application of a pulse of laser energy through the window panel 28 will create a force which moves the piston 14 by being directed at the face 26 thereof.

The pulse of laser energy may be provided by any suitable laser system 32 which is positioned to direct the pulse of laser energy through the transparent panel 28 onto the metallic film 30. Any conventional pulsed laser system including, for example, a Q-switch may be used. A Korad K-1Q laser system used in combination with a KDP Pockel cell has been found to be suitable.

Operationally, the force directed against the face 26 of the piston 14 operates to drive the piston 14 towards the opposite end of the internal cylindrical chamber 12. The lock pin 24 is intended to be sheared in the process. The broken lines included in FIG. 1 illustrates the final position of the piston stem 18 when the piston 14 has been driven to its active position adjacent the end wall 22 of the cylindrical chamber 12. Movement of the piston stem 18 may constitute the usable work stroke of a mechanical mover in accordance with this invention. For example, a switching device or the like may be operated by being connected to the piston stem 18.

As a specific example, a piston 14 having a diameter of 0.68 inches and weighing approximately 0.4 ounces was driven the length of an internal cylindrical chamber 12 having a length of 1 inch by the force produced by impinging a pulse of laser energy of 4.0 joules on an aluminum film 30 having a thickness of 1,000 Angstroms. A brass lock pin 24 having a diameter of 0.031 inches, and calibrated to shear when subjected to a force of 65 pounds, was used.

Referring now to FIG. 2, a number of mechanical movers may be readily actuated by having the energy from a laser system 32 divided and/or distributed by an optical control system 34 to be incident upon each of a plurality of mechanical movers 36. This assumes the use of a laser system that provides a laser pulse of sufficient energy level to permit division.

A suitable optical control system 34 may include a conventional optical element such as a beam splitter, or the like, which serves to appropriately redirect portions of the laser energy towards the respective mechanical movers 36 to produce concurrent actuation. Optical delay devices may be used to have certain ones of the mechanical movers 36 successively actuated. Similarly, an optical control system 34 may include means for selectively directing portions of a laser pulse, or successive laser pulses, at different ones of an array of mechanical movers 36. For example, a conventional rotating prism that is successively reoriented at prescribed time intervals may be used to direct successive laser pulses at selected mechanical movers 36.

Referring to FIG. 3, a fiber optic bundle 37 may be used as an alternative to the optical control system 34. Such an embodiment would involve directing the pulses of laser energy from the laser source 32 through a bundled end of the fiber optics bundle 38. The dispersed fibers at the other end of the bundle 38 would be associated with selected ones of the mechanical movers 36. Concurrent operation of the respective mechanical movers 36 may be accomplished by having the respective fiber optics of an equal length. Moderate delays may be accomplished by using fiber optics of different lengths to provide successive actuation of the movers 36. As an alternative, conventional optical delay devices may be inserted and interposed between the laser and the respective mechanical movers 36.

It is to be noted that mechanical movers in accordance with the present invention have the further advantage of being positionable within a hermitically sealed chamber or the like without requiring perforation of the walls to permit remote actuation since a laser pulse may be directed through a transparent window in the chamber wall. Where a direct line of sight is unavailable, fiber optics may be readily used to provide a devious conductive path within the sealed chamber for the laser energy. It is particularly noted that the subject invention does not produce wastes in a gaseous state and is therefore suitable for use in environments that are desired to be maintained sterile or otherwise free of contaminants.

It is further noted that although a single lock pin 24 has been discussed and described hereinabove, that multiple lock pins or even a lock diaphram may be used to retain the piston 14 at the ambient position.

From the foregoing discussion it is now clear that mechanical movers in accordance with the present invention may be remotely actuated by application thereto of a pulse of laser energy, an actuated mechanical mover being changed from an ambient position to an active position. It is also clear that the inventive mechanical movers are suitable for a number of different applications. As an example, the subject mechanical movers may be used as voltage breakers or as latches, or to accomplish other switching functions.

While a preferred embodiment of the present invention has been described hereinabove, it is intended that all matter contained in the above description and shown in the accompanying drawings be interpreted as illustrative and not in a limiting sense and that all modifications, constructions, and arrangements which fall within the scope and spirit of the invention may be made.

What is claimed is:

1. A mechanical device adapted to be moved from an ambient position to an active position when actuated, said mechanical device comprising:
    actuator means for producing a motive force in response to laser energy applied thereto, said actuator means including:
    a transparent window panel, and
    a metallic film retained on a surface of said transparent window panel, said metallic film positioned adjacent said working element to be vaporized by laser energy incident thereon through said transparent window panel; and
    a working element positioned adjacent to said actuator means, said working element being moved from an ambient position to an active position in response to said motive force.

2. The mechanical device defined by claim 1 further including:
    a housing having an internal chamber, said working element traveling in said chamber when moved from said ambient position to said active position; and
    locking means for retaining said working element at said ambient position, said locking means permitting movement of said working element in response to said motive force.

3. The mechanical device defined by claim 2, wherein said working element is a piston positioned to be moved from a first end of said chamber towards a second end of said chamber, said locking means being a pin extending through said piston and into at least one wall of said chamber, said actuator means being positioned at the first end of said chamber corresponding to said ambient position for said piston.

4. The mechanical device defined by claim 3, said piston having a piston stem extending therefrom and through a wall at said second end of said chamber, movement of said piston producing movement of said piston stem.

5. The mechanical device defined by claim 1, said laser energy being provided by a Q-switched laser.

6. The mechanical device defined by claim 6 wherein said laser energy is transmitted to said actuator by fiber optics.

7. The mechanical device defined by claim 4, wherein said thin film is aluminum.

8. The mechanical device defined by claim 4, wherein said thin film is carbon.

9. The mechanical device defined by claim 4, wherein said thin film is bismuth.

10. The mechanical device defined by claim 4, said laser energy being provided by a Q-switched laser.

11. The mechanical device defined by claim 10 wherein said laser energy is transmitted to said actuator by fiber optics.

12. A mechanical mover adapted to be actuated in response to the application thereto of laser energy, said mechanical mover comprising:
    a housing forming an internal cylindrical chamber having first and second ends, said housing having an aperture at said first end;
    a piston positioned within said chamber to be driven from said first end to said second end of said chamber in response to a motive force applied to said piston; and
    an actuator for applying said motive force to said piston in response to laser energy impinging thereon, said actuator including a transparent window panel situated in said aperture and a thin film on a surface of said window panel, said thin film being vaporized by laser energy impinging thereon via said transparent window panel.

13. The mechanical mover defined by claim 12 further including a lock pin for retaining said piston at said first end of said chamber, said lock pin permitting said piston to be moved towards said second end in response to said motive force.

14. The mechanical mover defined by claim 13 further including an optical conductor for directing said laser energy at said actuator.

15. The mechanical mover defined by claim 14 wherein said laser energy is provided by a Q-switched laser.

16. The mechanical mover defined by claim 12 wherein said thin film is aluminum.

17. The mechanical mover defined by claim 12 wherein said thin film is carbon.

18. The mechanical mover defined by claim 12 wherein said thin film is bismuth.

* * * * *